United States Patent
Lee et al.

(10) Patent No.: US 8,127,823 B2
(45) Date of Patent: Mar. 6, 2012

(54) INGOT-CASTING APPARATUS USING URANIUM DEPOSITS

(75) Inventors: Yoon Sang Lee, Daejeon (KR); Han Soo Lee, Daejeon (KR)

(73) Assignees: Korea Atomic Energy Research Institute, Daejeon (KR); Korea Hydro & Nuclear Power, Seoul (KR)

( * ) Notice: Subject to any disclaimer, the term of this patent is extended or adjusted under 35 U.S.C. 154(b) by 107 days.

(21) Appl. No.: 12/625,134

(22) Filed: Nov. 24, 2009

(65) Prior Publication Data

US 2011/0056647 A1     Mar. 10, 2011

(30) Foreign Application Priority Data

Sep. 7, 2009  (KR) ........................ 10-2009-0084028

(51) Int. Cl.
- *B22D 7/00* (2006.01)
- *B22D 7/06* (2006.01)
- *B22D 41/00* (2006.01)

(52) U.S. Cl. ......... 164/322; 164/323; 266/148; 266/157

(58) Field of Classification Search .................. 266/148, 266/157; 164/322, 323

See application file for complete search history.

(56) References Cited

U.S. PATENT DOCUMENTS

| | | | | |
|---|---|---|---|---|
| 2,966,709 A | * | 1/1961 | Winters et al. | 164/150.1 |
| 4,089,640 A | * | 5/1978 | Overmyer et al. | 432/73 |
| 6,070,644 A | * | 6/2000 | Grumm et al. | 164/66.1 |

OTHER PUBLICATIONS

"An experience of operation and development of Lab. scale ingot casting equipment with uranium deposit", Lee, Yoon Sang et al., Jun. 12, 2009.

\* cited by examiner

*Primary Examiner* — Jessica L Ward
*Assistant Examiner* — Erin Saad
(74) *Attorney, Agent, or Firm* — Kile Park Goekjian Reed & McManus PLLC (57) ABSTRACT

A casting apparatus includes a hermetically sealed chamber, wherein the chamber includes: a melt-heating portion to melt external uranium deposits, the melt-heating portion being tiltable to allow the resulting liquid molten material to be discharged to the outside, an ingot-forming portion to receive the molten material discharged from the melt-heating portion and to cool-solidify the molten material, and a salt-capturing portion provided on the melt-heating portion, to solidify a salt gas produced when the uranium deposits are molten, and thereby recover the salt gas, wherein the ingot-forming portion includes: a horizontal turn-table rotated by an operating means, and a plurality of molds mounted on the edge of the turn-table, each containing the molten material, which is then cooled.

5 Claims, 8 Drawing Sheets

INGOT-CASTING APPARATUS USING URANIUM DEPOSITS

BACKGROUND OF THE INVENTION

1. Field of the Invention

The present invention relates to a casting apparatus for preparing uranium ingots by melting uranium deposits. More specifically, the present invention relates to an ingot-casting apparatus using uranium deposits wherein uranium ingots can be continuously prepared in a single casting apparatus.

2. Description of the Related Art

Methods for extracting recycled uranium from spent nuclear fuels left behind after incinerated in a furnace include electro-refining technologies for temporarily storing or recycling uranium, comprising depositing uranium on a graphite cathode as a uranium electro-refining cathode to produce uranium deposits thereon and forming ingots from the deposits to recover uranium therefrom.

Uranium-ingot casting apparatuses prepare uranium ingots by melting uranium deposits recovered from a salt-distillation apparatus. Uranium deposits contain highly corrosive salts. For this reason, this melting process should be carried out under vacuum or inert gas atmosphere in order to prevent salts produced during the melting process from corroding neighboring devices.

In addition, uranium ingot casting apparatuses emit a great deal of salt in a gas phase, when heated to about 1,300° C. which is above the melting point of uranium. Accordingly, the apparatuses require a salt-removing means for separating the salt from the uranium deposits by capturing the salt, followed by cooling and solidifying.

An INL (Idaho National Laboratory) ingot casting apparatus capable of satisfying this requirement involves a batch-type process wherein one ingot is prepared in a single process, by placing uranium deposits in a crucible in an ingot vacuum chamber, melting the uranium deposits through heating, cooling the crucible to obtain an ingot, and separating the ingot from the crucible.

Such a batch-type ingot casting apparatus uses a single crucible, thus making it impossible to treat large volumes of uranium deposits and disadvantageously having low production efficiency, and having structural limitations of increasing a unit amount of uranium deposits treated.

In addition, once an ingot-preparation operation is finished, the vacuum chamber should be opened to transport the produced ingot and salt from the vacuum chamber, and in the following operation to treat uranium deposits, the vacuum chamber should be out-gassed and an inert gas should then be supplied thereto, causing an increase in operation costs.

SUMMARY OF THE INVENTION

Therefore, the present invention has been made in view of the above problems, and it is an object of the present invention to provide an ingot-casting apparatus wherein uranium ingots are continuously prepared in an airtight chamber.

It is another object of the present invention to allow the chamber to provide a preheated mold.

It is another object of the present invention to provide an ingot-casting apparatus with an increased single casting volume.

It is another object of the present invention to provide an ingot-casting apparatus with an increased single casting amount.

It is yet another object of the present invention to suitably capture the salt gas produced by melting uranium deposits and efficiently remove the same.

In accordance with the present invention, the above and other objects can be accomplished by the provision of an ingot casting apparatus using uranium deposits, the apparatus including a hermetically sealed chamber, wherein the chamber includes: a melt-heating portion to melt external uranium deposits, the melt-heating portion being tiltable to allow the resulting liquid molten material to be discharged to the outside; an ingot-forming portion to receive the molten material discharged from the melt-heating portion and to cool-solidify the molten material; and a salt-capturing portion provided on the melt-heating portion, to solidify a salt gas produced when the uranium deposits are molten, and thereby recover the salt gas, wherein the ingot-forming portion comprises: a horizontal turn-table rotated by an operating means; and a plurality of molds mounted on the edge of the turn-table, each containing the molten material, which is then cooled.

Each mold may be mounted on the cylindrical hole such that the bottom edge of the mold extends to a cylindrical hole vertically passing through the turn-table the fringe thereof and is thus separated upward, wherein the chamber further includes a pre-heating portion, wherein the pre-heating portion includes: an elevating unit provided under the turn-table, to support the bottom of the mold and vertically elevate the mold; and a heating unit to surround the periphery of the elevated mold, while being spaced therefrom, and to pre-heat the mold.

The apparatus may further include: a feeder to supply a predetermined amount of uranium deposits, to a crucible provided in the melt-heating portion, to produce a molten material.

The salt-capturing portion may include: a trapper arranged on the melt-heating portion, to collect a discharged salt gas; a vertical-conveyer unit to elevate the trapper above the melt-heating portion; and a discharge unit to discharge the trapper to the outside of the chamber.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Functions, constitutions and operations of the ingot casting apparatus using uranium deposits according to preferred embodiments of the present invention will be described with reference to the annexed drawings.

Figure 1:
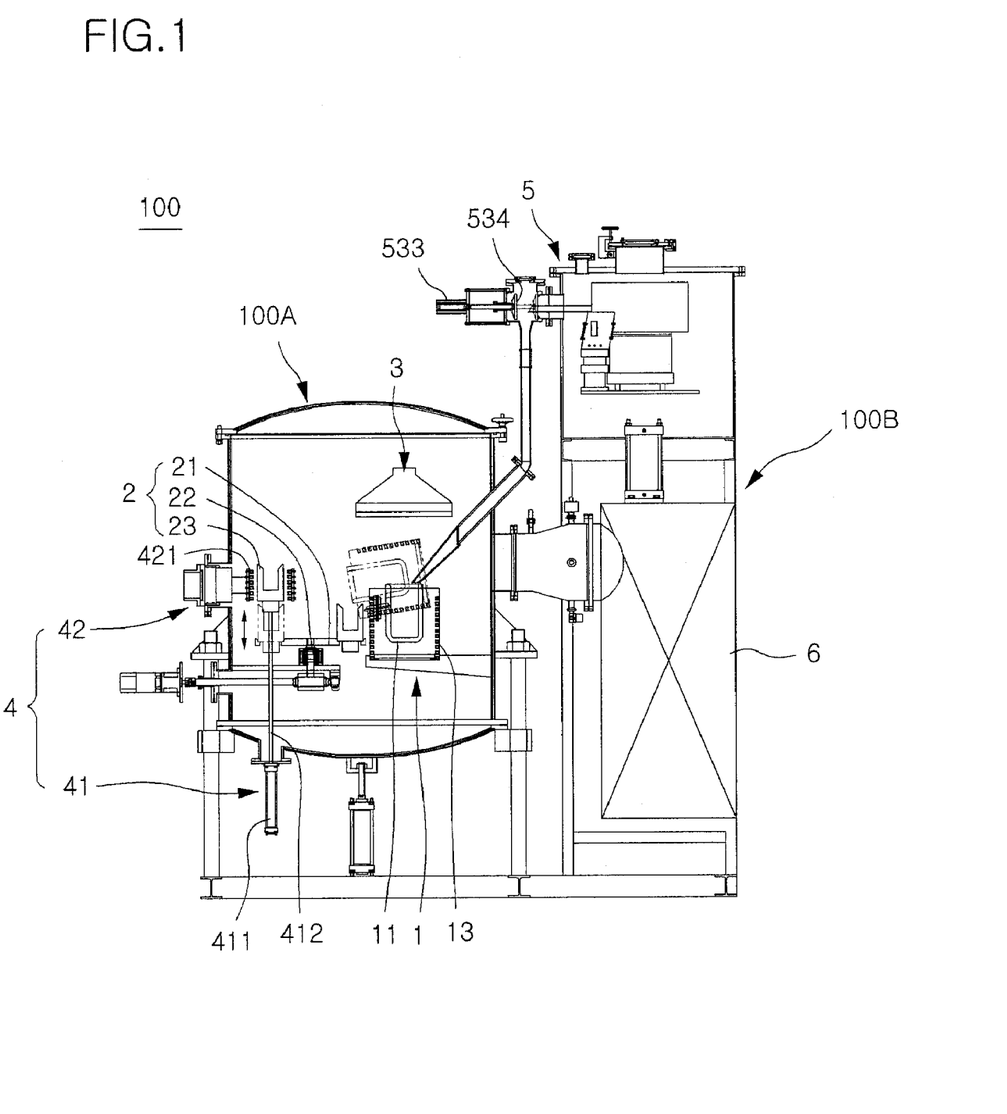
FIG. 1 is a schematic front-view illustrating the ingot casting apparatus according to the present invention.
Figure 2:
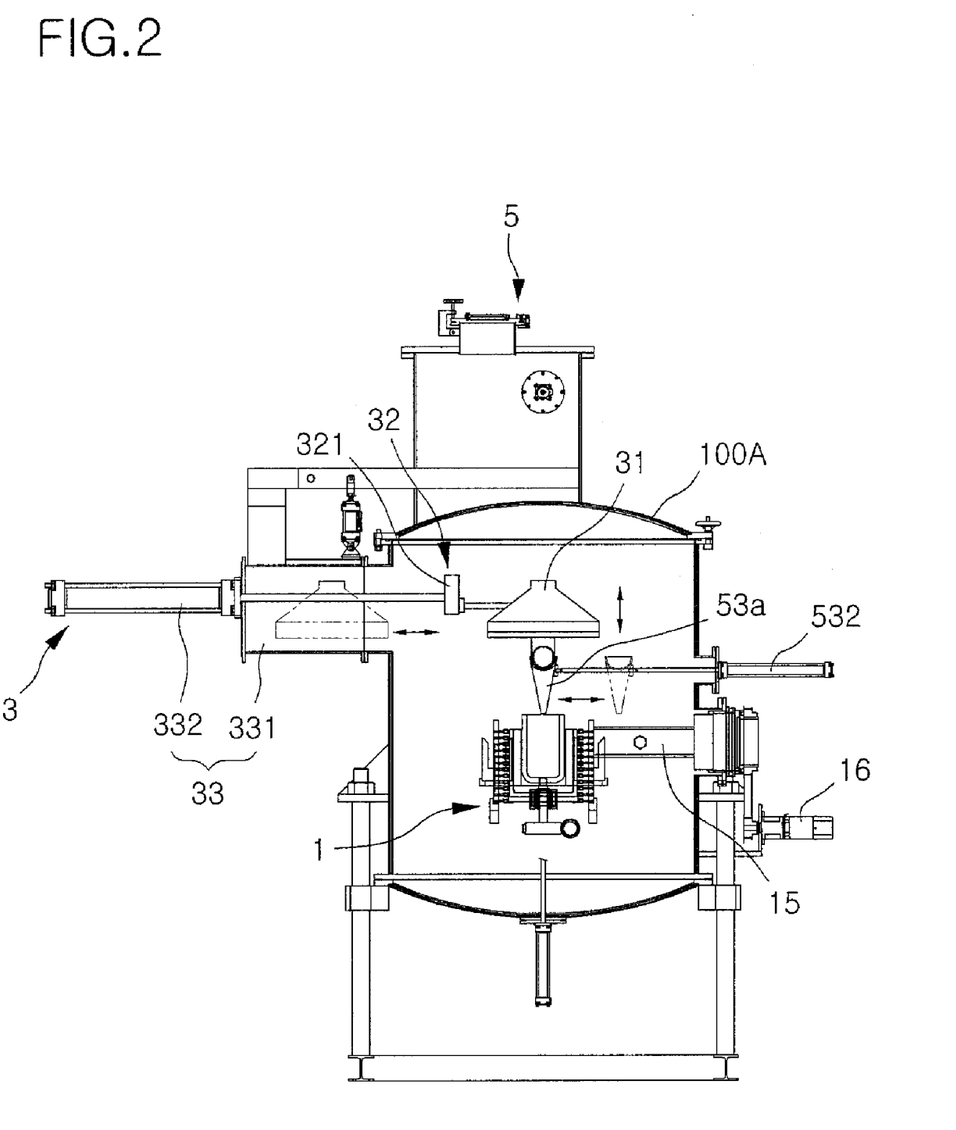
FIG. 2 is a schematic side-view illustrating the ingot casting apparatus according to the present invention.
Figure 3:
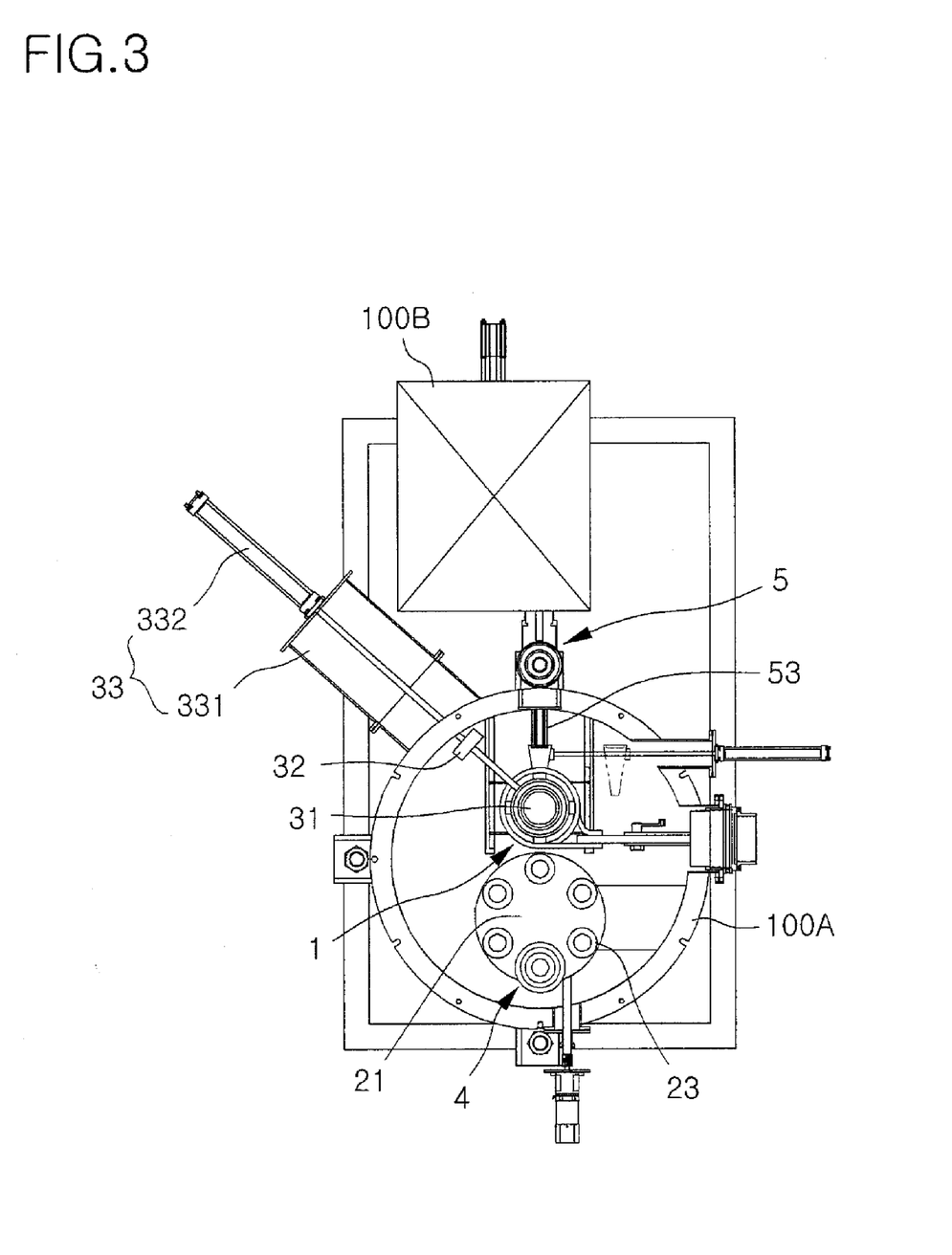
FIG. 3 is a schematic plan-view illustrating the ingot casting apparatus according to the present invention.

FIGS. 1 to 3 are, respectively, a front-view, a side-view and a plan-view schematically illustrating the ingot casting apparatus using uranium deposits according to one embodiment of the present invention.

The ingot casting apparatus 100 comprises a chamber 100A in which uranium deposits are melted and cast under vacuum, and a device portion arranged out the chamber 100A (hereinafter, referred to simply as "a device portion", 100B) to discharge the air present in the chamber to the outside and supply uranium deposits, in order to allow a casting process to be performed in the chamber 100A.

The chamber 100A, which is airtight, comprises a melt-heating portion 1 to melt external uranium deposits and thus to produce a molten material, and to be tilted in order to discharge the molten material, an ingot-forming portion 2 to receive the molten material discharged from the melt-heating portion 1 and to cool-solidify the same, thereby to produce an ingot, and a salt-capturing portion 3 mounted on the melt-heating portion 1, to solidify a salt gas produced when the uranium deposits are molten and thereby to recover the salt.

Meanwhile, the device portion 100B comprises a vacuum-forming device 6 to keep the chamber under vacuum during ingot-casting and a feeder 5 to feed a predetermined amount of powdery uranium deposits to the melt-heating portion.

The vacuum-forming device 6 has the same structure as known vacuum-forming devices which impart vacuum to the chamber by absorbing the air therefrom and discharging the same and a more detailed explanation thereof is thus omitted. The vacuum-forming device 6 serves to maintain the vacuum in the chamber to a predetermined level, i.e., oxygen concentration not higher than several tens of ppm, avoiding a phenomenon wherein the salt gas produced from uranium deposits comes in contact with oxygen and corrodes neighboring elements.

Meanwhile, instead of the vacuum-forming device, any replacement apparatus (not shown) known in the art, to convert the common air, including oxygen, present in the chamber into an inert gas and thereby to replace the air in the chamber with an inert atmosphere may be used. The fact that salt corrosion can be more efficiently prevented, when the chamber is under inert atmosphere, is well-known in the art.

Figure 4:
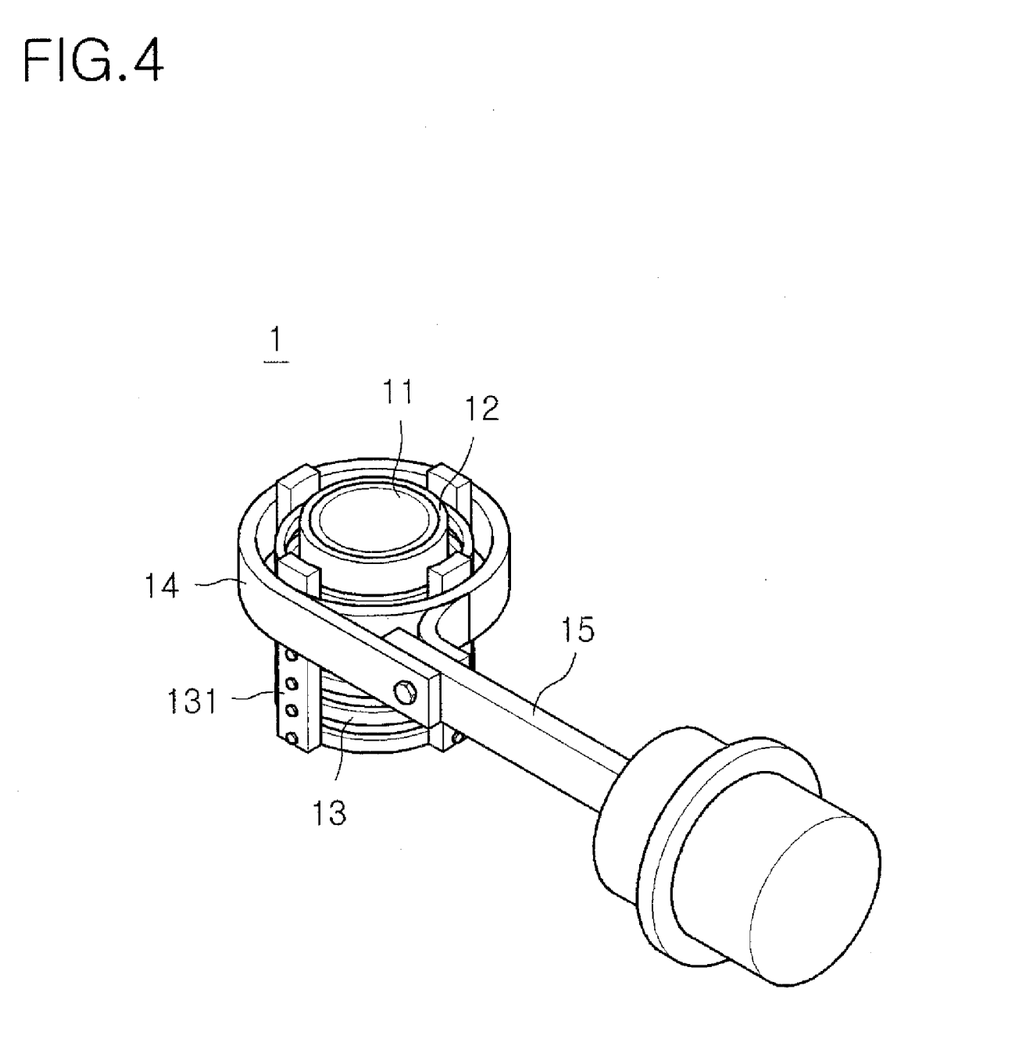
FIG. 4 is a schematic perspective view illustrating the melt-heating portion utilized in the present invention.

FIG. 4 is a perspective view schematically illustrating the melt-heating portion utilized in the present invention.

The melt-heating portion 1 comprises a crucible 11 whose peripheral surface and bottom surface are covered with a heat-insulating material 12, a high-frequency induction heating coil 13 which is spaced apart from the heat-insulating material 12 by a predetermined distance and receives a power source to heat the crucible 11, a nest 14 mounted to the external side of the high-frequency induction heating coil 13, a nest arm 15 connected to the nest 14, the nest arm serving to allow the crucible to be tilted, and an operating motor 16.

The high-frequency currency passing through the high-frequency induction heating coil 13 causes generation of eddy current in the crucible 11, thus allowing the crucible to be heated to 1,300° C. due to Joule's heat produced via resistance and thereby melting uranium deposits contained therein.

The nest 14 is connected to the high-frequency induction heating coil 13 through a fixing member 131 of the high-frequency induction heating coil 13 and one side thereof can rotate by an operating motor 16. This rotation of the operating motor 16 allows the crucible to be tilted, as shown in FIG. 1, to inject the molten material contained therein into a mold, as mentioned below.

Figure 5:
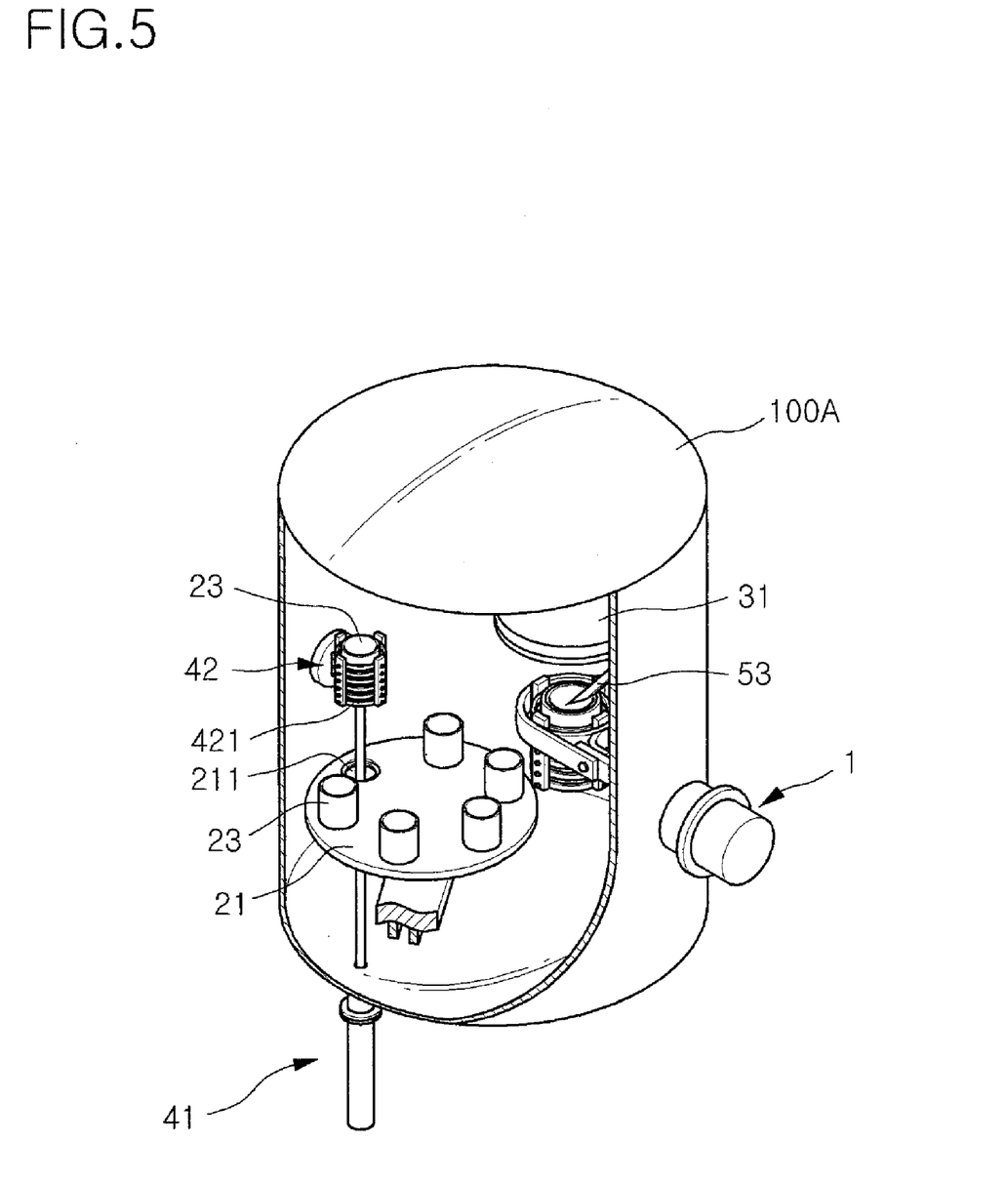
FIG. 5 is a schematic perspective view illustrating the ingot-forming portion and the pre-heating portion utilized in the present invention.

Meanwhile, the ingot-forming portion 2 comprises a horizontal turn-table 21 rotated by an operating means 22 and a plurality of molds 23 mounted on the edge of the turn-table 21, wherein each mold contains the molten material, which is then cooled.

The turn-table 21 is provided in one inner side of the chamber and an operating means 22 is provided under the turn-table 21, to rotate the turn-table 21. The rotation of the turn-table 21 is non-continuously carried out by an additional controlling portion (not shown).

Meanwhile, the plurality of molds 23 are mounted on the turn-table 21 along the edge thereof. The molds 23 have an inner structure, depending on the shape of the final products, namely, ingots, and have a cup-like shape.

The characteristics of the turn-table and molds are designed to allow the melt-heating portion 1 to be tilted and continuously prepare a plurality of ingots.

That is, in conventional methods wherein uranium deposits are molten and then cooled in a single crucible, continuous ingot preparation cannot be realized, since the crucible should be replaced after each ingot is prepared. On the other hand, in accordance with the present invention, the crucible 11 is used only to melt uranium deposits, and the molten material is transferred to the molds 23 in plural and then cool-solidified, thus making it possible to continuously prepare ingots.

In addition, while a molten material is produced in the melt-heating portion, the previously-poured molten material is cool-solidified in the corresponding mold. Accordingly, the time required to cast a single ingot is shortened and production efficiency is thus improved.

Meanwhile, the ingot prepared in the mold can be readily separated from the mold simply by applying a slight impact to the reversed mold. Although not shown, the ingot separated from the mold is transferred to the outside through a known antechamber and the vacant mold is returned to the turn-table, thereby realizing continuous ingot casting. The separation of ingots and returning of molds in the mold can be realized by automated equipment, such as robot arms, which are automatically controllable.

Meanwhile, the chamber 100A may further comprise a pre-heating portion 4 to pre-heat the mold and thereby to prevent a problem wherein a hot molten material is spattered to the outside, when poured into a cooled mold in the continuous ingot casting.

As shown in FIGS. 1 and 5, the mold can be elevated above the turn-table 21 and the peripheral surface of the elevated mold 23 is pre-heated by the pre-heating portion 4.

Specifically, referring to FIG. 5, a plurality of cylindrical holes 211, on which the mold 23 is mounted, vertically pass through the turn-table 21, and the mold 23 is mounted on the cylindrical hole 211 such that the bottom edge of the mold 23 contacts the fringe of the cylindrical hole 211.

The pre-heating portion 4 comprises an elevating unit 41 provided under the turn-table 21 to support the bottom of the mold 23 and vertically elevate the mold 23 and a heating unit 42 to surround the edge of the elevated mold 23 and thus pre-heat the mold 23.

The elevating unit 41 comprises an actuator 411 provided under the turn-table 21 and a load 412 passing through the cylindrical hole 211 by operation of the actuator 411, to elevate the mold 23 upward. The one end of the load 412 is connected to a base (not shown) to support the bottom of the mold.

In addition, the heating unit 42 is arranged on the load 412 such that it is vertical to the load 412, and includes a high-frequency induction heating coil 421 having an opened top and bottom. The high-frequency induction heating coil 421 has the same constitutions and operations as the high-frequency induction heating coil 13 provided in the melt-heating portion 1.

As a result, the mold 23 of the turn-table 21 is elevated through the load 412 to a height of the high-frequency induction heating coil 421 of the heating unit 42 and then pre-heated for a predetermined period. Then, the actuator 411 operates in an opposite direction, to allow the load 412 to be expanded and contracted and thus to suitably place the mold 23 on the cylindrical hole 211 of the turn-table 21. Then, the turn-table 21 rotates to allow the molten material contained in the melt-heating portion to be poured into the preheated mold.

In this case, the pre-heating portion 4 is provided in the chamber, thus advantageously feeding the preheated mold without opening the chamber. Accordingly, the phenomenon wherein the molten material is spattered, when it is injected into the mold, can be prevented and casting can thus be stably performed.

Figure 6:
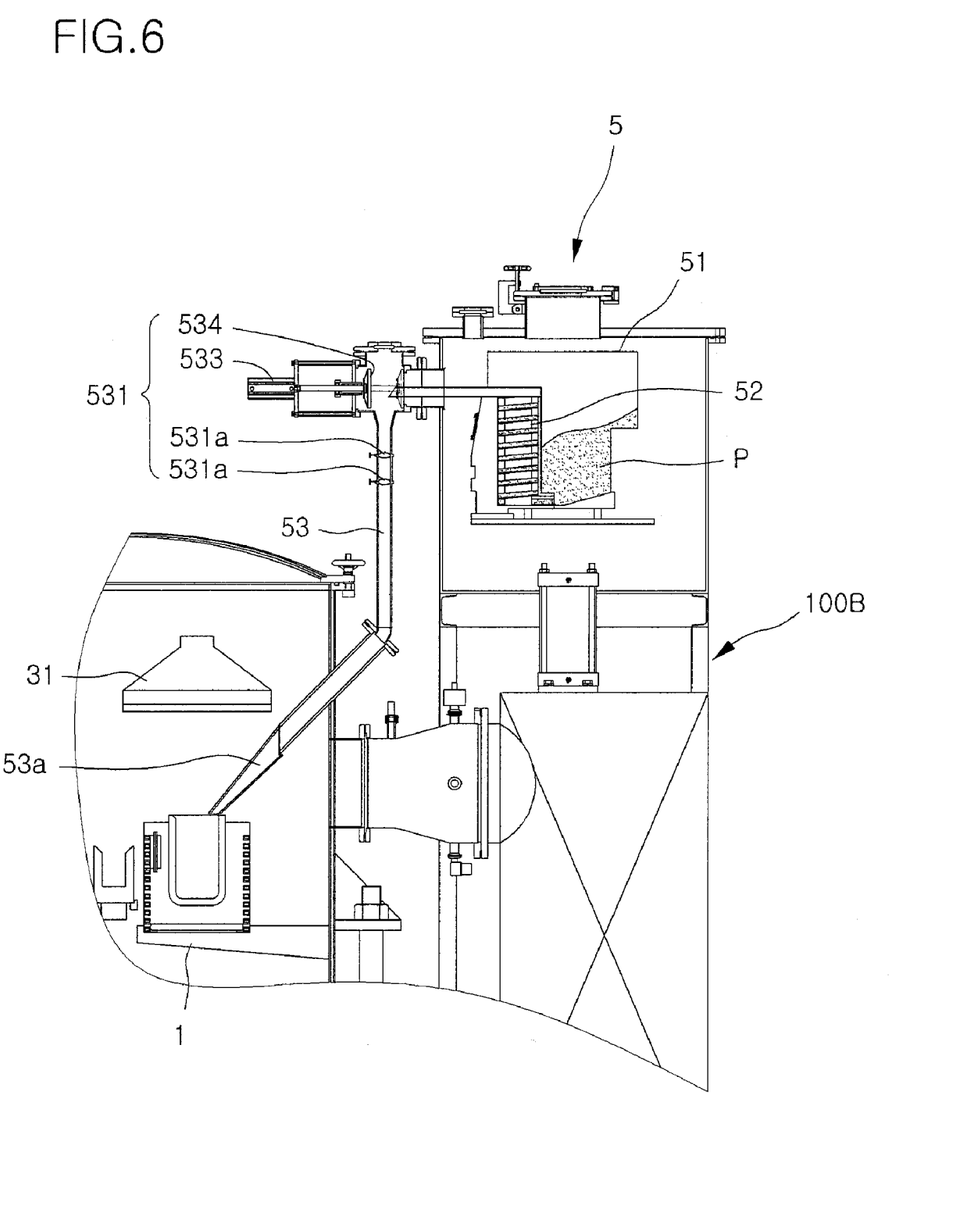
FIG. 6 is a schematic front view illustrating the feeder utilized in the present invention.

Referring to FIGS. 1 and 6, the device portion 100B further comprises the feeder 5 to supply a predetermined amount of uranium deposits to the crucible 11 which is provided in the melt-heating portion 1 and produces a molten material.

The feeder 5 provided in the device portion 100B comprises a hopper 51 to temporarily store uranium deposits P, a conveyor 52 to transfer the uranium deposits P from the hopper 51 to a upper part of the chamber 100A, and a funnel 53 to supply the uranium deposits from the conveyor 52 to the crucible 11 in the chamber.

The conveyor 52 transfers the uranium deposits in a predetermined unit amount which can be estimated by a user, up to a level which is at least higher than the melt-heating portion 1. The conveyor 52 may include a trolley conveyor to draw up powdery uranium deposits contained in the hopper, or a spiral elevator to transfer uranium deposits upward through combinations of vertical vibrations.

Meanwhile, the funnel 53 is a pipe-type member, one end of which is connected to the conveyor 52 and the other end of which is arranged to one upper side of the crucible 11 of the melt-heating portion 1 provided in the chamber 100A, and serves as a passage, through which uranium deposits transferred on the chamber 100A by the conveyor 52 are injected into the crucible 11.

The chamber is kept under vacuum or inert gas atmosphere and thus further comprises a shielding means 531 to prevent external air from entering the chamber through the funnel. The shielding means 531 may be composed of a pair of funnels 53 provided in upper and lower parts in the funnels. The upper and lower dampers 531a alternately open according to the transfer of uranium deposits, to allow the uranium deposits to be feed into the chamber, while minimizing the flow of external air thereinto. That is, the upper damper is opened to allow uranium deposits to be deposited on the closed lower damper, and on the other hand, the upper damper is closed and only the lower damper is opened to allow uranium deposits present between the upper and lower dampers to flow into the crucible.

In addition, an airtight plate 534 to shield an outlet of the conveyor 52, and an actuator 533 to horizontally operate the airtight plate 534 and thus to open or close the outlet may be provided as the shielding means 531.

Meanwhile, instead of the shielding means, a glove box capable of keeping the vacuum condition is mounted and the feeder may be arranged in the glove box. In this case, the afore-mentioned shielding means is not required, thus simplifying feeder constitution.

Meanwhile, it is preferred that the other end of the funnel 53 be arranged as close as possible on the crucible 11 to allow uranium deposits to be directly injected into the melt-heating portion, while uranium deposits have no great head drop energy. This is an essential element to prevent the phenomenon wherein the molten material previously produced in the crucible is spattered, while uranium deposits are fall, contact the adjacent high-frequency induction heating coil and cause damage to the device.

In this case, the other end of the funnel 53 should be isolated from the passage of the tilted melt-heating portion so that it does not interfere in tilting of the melt-heating portion 1.

For this constitution, as shown in FIGS. 2 and 3, a lower part 53A of the funnel 53 is connected to an actuator 532 provided at an external side of the chamber 100A, and the funnel 53 is moved outside from an upper part of the melt-heating portion 1 by extension/contraction of the actuator 532 and thus avoids interference with the tilting of the melt-heating portion 1.

The feeder 5 injects a predetermined amount of uranium deposits into the crucible to enable continuous production of the molten material in the melt-heating portion 1. In addition, by controlling operation of the feeder 5, the unit amount of uranium deposits injected during each melting process can be varied, and various volumes of ingots can be thus cast. In conventional techniques, ingots are cast in a batch-type wherein uranium deposits should be previously placed in a crucible and the volume of molten material obtained by a single casting process is thus limited. On the other hand, the feeder in accordance with the present invention continuously feeds uranium deposits, thus considerably increasing the volume of molten material obtained by single casting. Accordingly, the present invention can increase the amount of molten material obtained by single casting, in spite of using a small size of devices, as compared to conventional technologies. More specifically, in accordance with the conventional batch-type, a molten material can be obtained in the same amount as the volume of uranium deposits initially filled in a crucible, while, in accordance with the present invention, uranium deposits can be additionally feed to the molten material and the volume of the crucible can thus be reduced, thus advantageously considerably increasing the amount of molten material obtained by single melting, while realizing miniaturization of devices. When taking into consideration the fact that uranium deposits commonly undergo about a 9-fold decrease in volume, when they are molten, conventional methods can obtain 1.5 liters of molten material using a 150 liter crucible, while the present invention can prepare a greater amount of molten material using a small 50-liter crucible. As mentioned above, in the present invention, the crucible is designed to have a small volume, thus advantageously involving high efficiency, in view of savings in application costs due to low equipment costs and low consumption of electric power.

Figure 7:
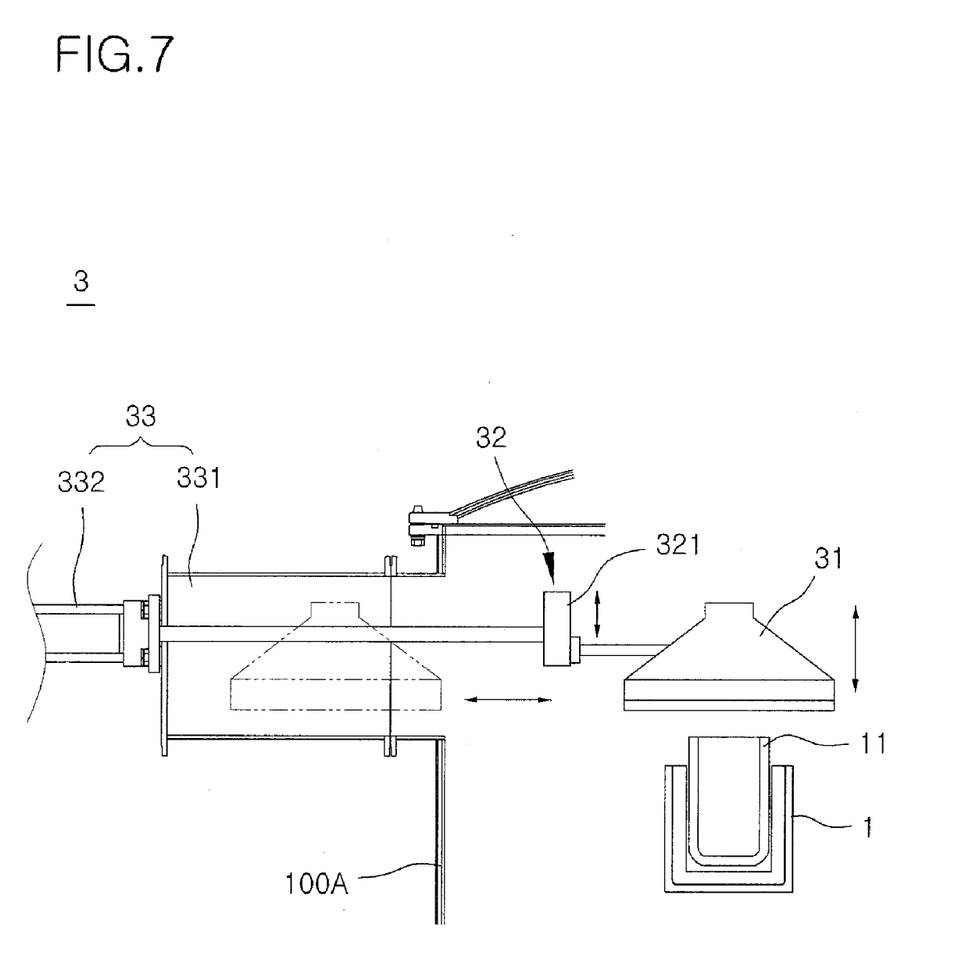
FIG. 7 is a schematic side-view illustrating a salt-capturing portion utilized in the present invention.

Meanwhile, FIG. 7 is a view illustrating a salt-capturing portion utilized in the present invention.

The salt-capturing portion 3 comprises a trapper 31 arranged on the melt-heating portion 1, to collect a discharged salt gas, a vertical-conveyer unit 32 to elevate the trapper 31 above the melt-heating portion 1 and a 33 to discharge the trapper 31 to the outside of the chamber.

The trapper 31 provides a passage, through which a salt gas passes, and the salt gas flowing in the trapper 31 is rapidly cooled and solidified, while contacting an inner wall of the trapper. As a result, the salt can be collected in the trapper as a solid.

Figure 8:
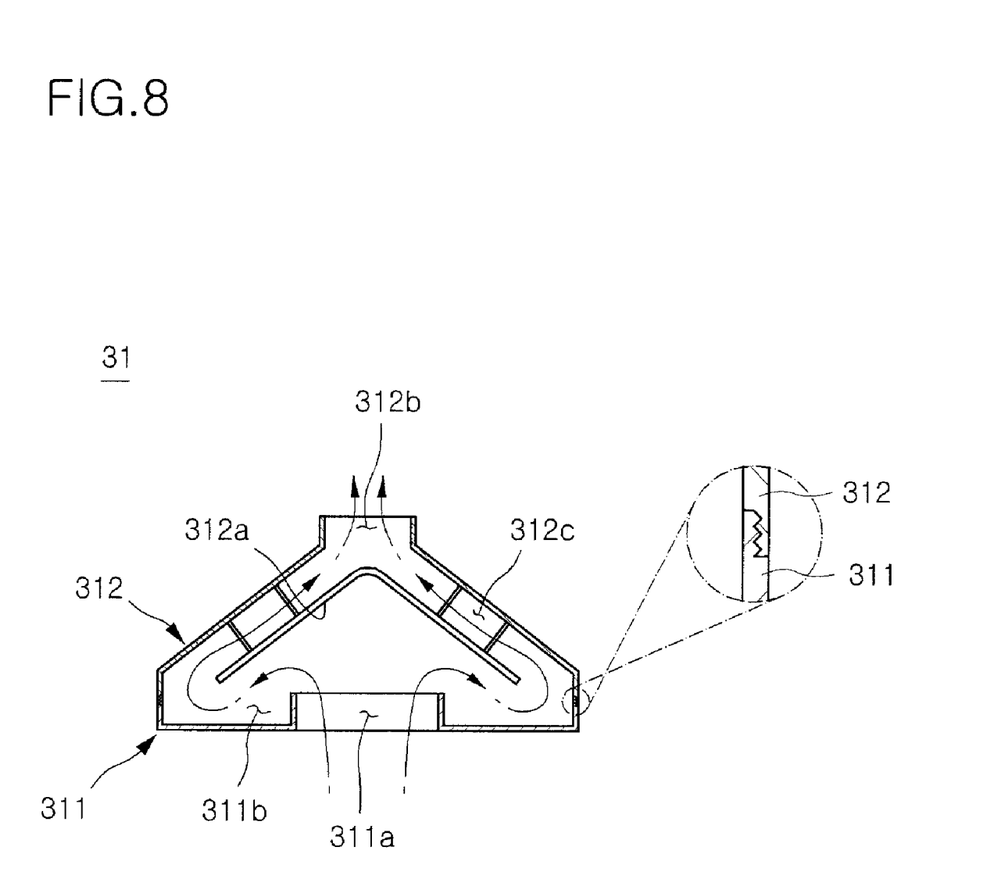
FIG. 8 is a schematic side sectional view illustrating the trapper utilized in the salt-capture portion shown in FIG. 7.

As shown in FIG. 8, the trapper 31 comprises a lower body 311 close to the melt-heating portion 1 and an upper body 312 to discharge a salt gas, wherein the lower body 311 and the upper body 312 are separated from each other through a screw.

The lower body 311 is provided with an inlet hole 311a through which a salt gas enters, and a capture area 311b wherein the edge of the inlet hole 311a extends upward in the trapper 31, to provide a space in which a salt is solidified and thus captured.

In addition, the upper body 312 is provided with a inner cooling plate 312a which is arranged above the inlet hole 311a, such that it is spaced therefrom, and has a sloped surface inclined downward to the capture area 311b, to induce flow of the salt gas injected through the inlet hole 311a toward the capture area 311b, and a gas channel 312c arranged on the inner cooling plate 312a, wherein one side of the gas channel 312c is communicated with the capture area 311b and the other side thereof is communicated with the outlet 312b, to transfer the gas passing through the capture area 311b to the outlet 312b arranged on the trapper 31.

As a result, the salt gas elevated from the melt-heating portion 1 flows in the trapper 31 through the inlet hole 311a, is moved to the capture area 311b through the inner cooling plate 312a and at the same time, contacts an inner surface of the lower body 311 constituting the inner cooling plate 312a and the capture area 311b and is rapidly cooled. At this time, the salt ingredient contained in the salt gas is solidified and grown in a crystal phase in the capture area. Then, the remaining gas moved along the edge of the capture area 311b is transferred to the outlet 312b through the gas channel 312c interposed between the upper body 312 and the inner cooling plate 312a and is then discharged to the outside of the trapper 31.

Meanwhile, the crystalline salt captured in the capture area 311b of the lower body 311 can be readily isolated from the lower body 311 by separating the lower body 311 from the upper body 312 and applying light impact thereto.

Meanwhile, the trapper 31 can be vertically elevated by the vertical-conveyer unit 32 to avoid intervening in the transfer passage of the melt-heating portion 1 during tilting of the melt-heating portion 1. The vertical-convey unit 32 may comprise an LM guide 321 arranged in a vertical direction on the side of the trapper 31 or other well-known vertical-transfer elements.

Meanwhile, the discharge unit 33 serves to discharge the trapper 31 to the outside of the chamber, and comprises an actuator 332 arranged on an antechamber 331 mounted on one side of the chamber, to move the trapper 31 in a horizontal direction. Based on this structure, the salt captured in the lower body can be removed, after the trapper is discharged to the outside.

The ingot casting apparatus using uranium deposits according to the present invention will be described with reference to the annexed drawings.

Uranium deposits P are placed in the hopper 51 present in the feeder 5 and are transferred to an upper part of the chamber 100A by the conveyor 52. Then, the airtight plate 534 and the upper damper 531a are opened to transfer a small amount of the uranium deposits into the funnel.

The chamber 100A is kept airtight and is vacuumized by the vacuum-forming device 6. Then, the lower damper 531a is opened to inject the uranium deposits into the crucible, and electric power is applied to the high-frequency induction heating coil 13 to melt the uranium deposits and thus produce a molten material.

At this time, the uranium deposits are injected into the crucible by intermittently operating the feeder 5 until a predetermined amount of molten material is obtained.

Electric power is applied to the high-frequency induction heating coil 421 of the heating unit 42 and a single mold 23 is elevated by operating the elevating unit 411 in one direction and is then pre-heated. The elevating unit 411 is operated in the opposite direction to re-place the pre-heated mold 23 on the turn-table 21 and an operating means operates to transfer the pre-heated mold 23 to the melt-heating portion 1.

Then, the operating motor 16 of the melt-heating portion 1 is operated in one direction to allow the crucible 11 to be tilted and thus inject a liquid molten material into the pre-heated mold 23. Then, the operating motor 16 is operated in the opposite direction to allow the crucible to return to its original position. As mentioned above, uranium deposits are injected into the crucible through the funnel 5 to produce a novel molten material.

The uranium deposits poured into the mold 23 are cooled and solidified in an ingot phase, while another mold is pre-heated and then transferred to the melt-heating portion.

Then, the ingot is separated from the mold by a means, such as a robot arm, and the mold is then loaded on the turn-table again.

The afore-mentioned process is repeated, to realize continuous ingot casting.

As apparent from the fore-going, the preferred embodiments of the present invention provide an ingot casting apparatus using uranium deposits wherein several ingot castings are simultaneously performed even in a single process by using a plurality of molds arranged on the turn-table, thus advantageously rapidly treating large volumes of uranium deposits.

In particular, the melting of uranium deposits in the tilted melt-heating portion and the solidification of the molten material in the plurality of molds arranged on the turn-table are simultaneously performed in different regions, thus advantageously realizing rapid continuous casting.

In addition, the chamber comprises the pre-heating portion, thus advantageously preheating the mold in the air-tight chamber. In addition, the pre-heating of the mold enables stable injection thereof into the molten material.

Further, the chamber further comprises a feeder to inject a predetermined amount of uranium deposits into a crucible, thus advantageously increasing the volume of molten material obtained in each melting process and obtaining greater volumes of ingots with a smaller crucible, as compared to conventional technologies, thereby designing the ingot casting apparatus with an increased casting unit volume.

In addition, the salt-capture portion is further provided in the ingot casting apparatus, thus advantageously readily capturing salt emitted upward from the crucible. In particular, the trapper is provided such that upper and lower parts thereof can be separated from each other, thus advantageously readily discharging the captured salt.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. An ingot casting apparatus using uranium deposits, the apparatus comprising a hermetically sealed chamber,
wherein the chamber comprises:
a melt-heating portion to melt external uranium deposits, the melt-heating portion being tiltable to allow the resulting liquid molten material to be discharged;

an ingot-forming portion to receive the molten material discharged from the melt-heating portion and to cool-solidify the molten material; and a salt-capturing portion provided on the melt-heating portion, to solidify a salt gas produced when the uranium deposits are molten, and thereby recover the salt gas, wherein the ingot-forming portion comprises:

a horizontal turn-table rotated by a motor; and a plurality of molds mounted on the edge of the turn-table, each containing the molten material, which is then cooled, wherein the chamber further comprises a pre-heating portion, wherein the pre-heating portion comprises:

an elevating unit provided under the turn-table to support a bottom of each mold and vertically elevate each mold; and a heating unit to surround a periphery of each elevated mold, while being spaced therefrom, and to pre-heat each mold.

2. The apparatus according to claim 1, wherein each mold is mounted in a cylindrical hole such that bottom edge of each mold is in contact with a fringe of the cylindrical hole, the cylindrical hole vertically passing through the turn-table.

3. The apparatus according to claim 1, further comprising:

a feeder to supply a predetermined amount of uranium deposits, to a crucible provided in the melt-heating portion, to produce a molten material.

4. The apparatus according to claim 1, wherein the salt-capturing portion comprises:

a trapper arranged on the melt-heating portion, to collect a discharged salt gas;

a vertical-conveyer unit to elevate the trapper above the melt-heating portion; and a discharge unit to discharge the trapper to the outside of the chamber.

5. The apparatus according to claim 4, wherein the trapper comprises a lower body and an upper body which are joined to each other, such that they are separated from each other, wherein the lower body comprises:

an inlet hole through which a salt gas enters; and a capture area wherein the edge of the inlet hole extends upward in the trapper, to solidify and capture the salt, the upper body comprises:

an inner cooling plate spaced from the top of the inlet hole, the inner cooling plate having a sloped surface inclined downward to the capture area, to induce flow of the salt gas injected through the inlet hole toward the capture area; and a gas channel arranged on the inner cooling plate, wherein the one side of the gas channel is communicated with the capture area and the other side of the gas channel is communicated with an outlet arranged in a upper position, to transfer the gas passing through the capture area to the outlet.

* * * * *